US010927993B2

United States Patent
Dole et al.

(10) Patent No.: US 10,927,993 B2
(45) Date of Patent: Feb. 23, 2021

(54) PIPE PLUG AND METHOD OF USE

(71) Applicant: Victaulic Company, Easton, PA (US)

(72) Inventors: Douglas R. Dole, Whitehouse Station, NJ (US); Wei Wang, Bethlehem, PA (US); James Van Wert, Franklin, OH (US)

(73) Assignee: Victaulic Company, Easton, PA (US)

( * ) Notice: Subject to any disclaimer, the term of this patent is extended or adjusted under 35 U.S.C. 154(b) by 96 days.

(21) Appl. No.: 16/184,422

(22) Filed: Nov. 8, 2018

(65) Prior Publication Data

US 2019/0078717 A1    Mar. 14, 2019

Related U.S. Application Data

(62) Division of application No. 15/358,504, filed on Nov. 22, 2016, now Pat. No. 10,156,312.

(60) Provisional application No. 62/359,395, filed on Jul. 7, 2016, provisional application No. 62/260,922, filed on Nov. 30, 2015.

(51) Int. Cl.
| | |
|---|---|
| *F16L 55/11* | (2006.01) |
| *F16L 13/14* | (2006.01) |
| *A62C 35/68* | (2006.01) |
| *F16L 17/02* | (2006.01) |
| *F16L 25/14* | (2006.01) |

(52) U.S. Cl.
CPC .............. *F16L 55/11* (2013.01); *A62C 35/68* (2013.01); *F16L 13/143* (2013.01); *F16L 17/02* (2013.01); *F16L 25/14* (2013.01)

(58) Field of Classification Search
CPC ......... F16L 55/11; F16L 17/02; F16L 13/143; F16L 25/14; A62C 35/68

USPC ........... 138/89, 109; 277/627, 602, 608, 616
See application file for complete search history.

(56) References Cited

U.S. PATENT DOCUMENTS

| 63,364 A | 4/1867 | Cochrane |
| 412,626 A | 10/1889 | Jones |
| 1,414,668 A | 5/1922 | Reed |
| 2,686,442 A | 8/1954 | Wilson |
| 3,277,684 A | 10/1966 | Gareri |
| 4,018,462 A | 4/1977 | Saka |
| 4,173,877 A | 11/1979 | Kreiskorte |

(Continued)

FOREIGN PATENT DOCUMENTS

| CN | 202834505 U | 3/2013 |
| CN | 203703420 U | 7/2014 |

(Continued)

OTHER PUBLICATIONS

Thomas, Shane; International Search Report from counterpart International Patent Application No. PCT/US2016/063284, dated Jan. 25, 2017, pp. 1-2, United States Patent and Trademark Office as Searching Authority, Alexandria, Virginia USA.

(Continued)

*Primary Examiner* — Craig M Schneider
*Assistant Examiner* — David R Deal
(74) *Attorney, Agent, or Firm* — Ballard Spahr LLP (57) ABSTRACT

A plug for sealing a pipe element has a cylindrical body with a circumferential groove which receives seals. The plug fits within the pipe element and is secured and sealed by a deformation formed in the pipe element by a circumferential groove. The deformation mechanically engages the grooves in the body of the adapter and the plug.

4 Claims, 6 Drawing Sheets

(56) References Cited

U.S. PATENT DOCUMENTS

| | | |
|---|---|---|
| 4,577,874 A | 3/1986 | Zitting |
| 4,660,803 A | 4/1987 | Johnston et al. |
| 5,002,318 A | 3/1991 | Witter |
| 5,040,729 A | 8/1991 | Carrozza |
| 5,469,890 A | 11/1995 | Carpentier |
| 5,479,961 A | 1/1996 | DeMarsh et al. |
| 5,694,978 A * | 12/1997 | Heilmann ............. A61M 39/20 138/103 |
| 5,934,711 A | 8/1999 | Gady |
| 6,145,892 A | 11/2000 | Weber |
| 6,257,267 B1 | 7/2001 | Fujiwara et al. |
| 6,338,263 B1 | 1/2002 | Obata et al. |
| 6,543,785 B1 | 4/2003 | Katayama et al. |
| 6,663,112 B1 * | 12/2003 | Sporre .................... F16L 21/03 277/584 |
| 6,968,719 B2 | 11/2005 | Zifferer |
| 6,976,712 B2 | 12/2005 | Lukach, Jr. |
| 7,163,028 B1 * | 1/2007 | Atkinson ............ F16L 55/1108 138/109 |
| 7,690,527 B2 * | 4/2010 | Englund .............. B65D 39/084 215/343 |
| 7,997,112 B2 | 8/2011 | Sandman et al. |
| 8,419,021 B2 * | 4/2013 | Mellander ............ F16J 15/061 277/567 |
| 8,579,257 B2 * | 11/2013 | Taylor ................... F16J 15/104 251/324 |
| 9,003,851 B2 | 4/2015 | Obata et al. |
| 9,109,701 B1 * | 8/2015 | Copeland ............... F16L 21/03 |
| 10,385,551 B1 * | 8/2019 | Koshel ................... F16L 33/08 |
| 2002/0074741 A1 * | 6/2002 | Knapp ................... F16L 21/03 277/626 |
| 2004/0017082 A1 | 1/2004 | Lukach |
| 2006/0071469 A1 | 4/2006 | Romanelli et al. |
| 2006/0214380 A1 | 9/2006 | Dietle et al. |
| 2008/0011376 A1 * | 1/2008 | Belford .................. F16L 41/14 138/89 |
| 2008/0012326 A1 | 1/2008 | Braathen et al. |
| 2010/0225111 A1 * | 9/2010 | Owen .................... F16J 15/121 285/374 |
| 2010/0270753 A1 * | 10/2010 | Knapp ................... F16J 15/104 277/608 |
| 2011/0163531 A1 | 7/2011 | Altmann et al. |
| 2011/0183025 A1 | 7/2011 | Funka, Jr. |
| 2012/0161436 A1 | 6/2012 | Salehi-Bakhtiari |
| 2012/0266971 A1 * | 10/2012 | Nourian ............. F16L 55/1108 137/15.08 |

FOREIGN PATENT DOCUMENTS

| | | |
|---|---|---|
| CN | 103962269 A | 8/2014 |
| DE | 19816253 A1 | 10/1999 |
| DE | 202013004655 U1 | 5/2013 |
| EP | 1705416 A1 | 9/2006 |
| EP | 2204598 A1 | 7/2010 |
| FR | 361592 | 9/1906 |
| GB | 2254389 A | 10/1992 |
| JP | 07328142 | 12/1995 |
| JP | 2002-113539 A | 4/2002 |
| JP | 2003210604 | 7/2003 |
| JP | 2004052849 | 2/2004 |
| KR | 20100002539 | 1/2010 |
| RU | 114746 U1 | 4/2012 |
| WO | WO-2015/064059 A1 | 5/2015 |

OTHER PUBLICATIONS

Thomas, Shane; Written Opinion from counterpart International Patent Application No. PCT/US2016/063284, dated Jan. 25, 2017, pp. 1-6, United States Patent and Trademark Office as Searching Authority, Alexandria, Virginia USA.

Author Unknown, SP—The Best Pipe in the World, Company Website, Products, Press Fittings; obtained online at http:www.superpipe.co.za/SP_Press Fittings.htm; on Sep. 25, 2015, pp. 1-2.

* cited by examiner

PIPE PLUG AND METHOD OF USE

CROSS REFERENCE TO RELATED APPLICATIONS

This application is a divisional of and claims benefit of priority to U.S. application Ser. No. 15/358,504, filed Nov. 22, 2016, which application is based upon and claims benefit of priority to U.S. Provisional Patent Application No. 62/260,922, filed Nov. 30, 2015 and U.S. Provisional Patent Application No. 62/359,395 filed Jul. 7, 2016, the aforementioned non-provisional and both provisional applications being hereby incorporated by reference.

FIELD OF THE INVENTION

This invention relates to plugs for sealing off pipe ends.

BACKGROUND

Traditional installation of fire suppression system piping networks uses steel pipe elements with male cut threads joined by female threaded fittings (tees, elbows, reducers) to position sprinklers in specified locations throughout the structure under construction. The cut threaded piping is laborious and messy to prepare and install. Many pipe elements must be prepared on site where they are individually measured and cut to length; their ends threaded using dedicated thread cutting machines, and joined with female threaded fittings using pipe dope and/or tape. Thread cutting is particularly messy, as it involves cutting oil, which contaminates and stains surfaces that it contacts, and oily waste metal cutting chips which must be collected and disposed of.

In view of the disadvantages associated with cut threaded pipe, grooved pipe elements and groove-engaging mechanical pipe couplings and fittings have become the preferred hardware for constructing piping networks. Using grooved pipe elements and groove-engaging mechanical couplings and fittings substantially eliminates the need to cut threads in the pipe elements, as the mechanical couplings and fittings engage circumferential grooves positioned near the ends of the pipe elements. Often the grooves are cold formed in the pipe elements on site using roll grooving machines which do not use cutting oil or produce waste metal chips. Such mechanical pipe couplings also allow fittings which terminate a pipe run to be attached without thread cutting.

However, to complete an installation the sprinkler must be connected to its pipe element. Sprinklers have a male threaded end, and the male threaded end is predominantly smaller (½-¾ inch pipe size) than the 1 inch schedule 40 pipe size that is used, for example, in the so-called "arm-over" configuration described below. In the arm-over configuration, commercially available female-female threaded reducing fittings are used to connect the smaller (male threaded) sprinkler end to the larger (male threaded) pipe element. Thus even when groove-engaging mechanical fittings and couplings are used, this last pipe element that connects to the sprinkler must have male threads cut in the end that joins to the female-female threaded reducing fitting. It would be advantageous to eliminate all thread cutting steps from the process of constructing piping networks for fire suppression systems. It would be further advantageous if it were possible to eliminate the need for a mechanical coupling to seal off a pipe run.

SUMMARY

The invention concerns an adapter for attaching a sprinkler to a pipe element. In one example embodiment the adapter comprises a body having an inner surface defining a bore therethrough and an outer surface surrounding the inner surface. A plurality of flat surfaces are positioned on the outer surface. At least a first groove is positioned in the outer surface and extends circumferentially about the bore. At least a first seal is positioned within the first groove. At least a first portion of the body is sized to interfit within the pipe element such that the first seal is positionable within the pipe element.

An example embodiment may further comprise a second seal positioned within the first groove. Another example may further comprise a second groove positioned in the outer surface and extending circumferentially about the bore. A second seal is positioned within the second groove.

In another example embodiment a washer surrounds the outer surface. The washer is positioned adjacent to the first portion of the body sized to interfit within the pipe element. In this example embodiment an outer groove is positioned in the outer surface and extends circumferentially about the bore. The outer groove is positioned in spaced relation away from the first groove. The washer is positioned within the outer groove.

By way of specific example a second portion of the body is larger than the first portion of the body so as not to interfit within the pipe element. In another example embodiment the first portion of the outer surface further comprises a plurality of curved surfaces extending around the body. Each one of the flat surfaces is contiguous with two of the curved surfaces, and the second portion of the body comprises a plurality of flat surfaces positioned on the outer surface. By way of example, the curved surfaces are convexly curved. In another example embodiment, pipe threads are positioned on the inner surface.

Further by way of example, a second seal surrounds the first seal. The first seal comprises a resilient material and the second seal comprises a compliant material. In a particular example, the second seal has a rectangular cross section. By way of further example, the second seal may be selected from the group consisting of polyester, a silicone adhesive, an acrylic adhesive or an expanding gel seal.

The invention further encompasses an adapter for attaching a sprinkler to a pipe element. In an example embodiment the adapter comprises a body having an inner surface defining a bore therethrough. An outer surface surrounds the inner surface. A first portion of the outer surface has a plurality of flat surfaces and a plurality of curved surfaces extending around the body. Each one of the flat surfaces is contiguous with two of the curved surfaces. A second portion of the outer surface has a plurality of flat surfaces extending around the body. At least a first groove is positioned in the first portion of the outer surface and extends circumferentially about the bore. At least a first seal is positioned within the first groove.

Another example embodiment further comprises a second groove positioned in the first portion of the outer surface. The second groove extends circumferentially about the bore. A second seal is positioned within the second groove. A further example comprises a washer surrounding the outer surface. The washer is positioned between the first and second portions of the outer surface. An outer groove may be positioned in the outer surface. The outer groove extends circumferentially about the bore in this example. The outer groove is positioned between the first and second portions of the outer surface, and the washer is positioned within the outer groove.

In an example embodiment, pipe threads are positioned on the inner surface. By way of example, the curved surfaces are convexly curved.

A further example embodiment comprises a second seal surrounding the first seal. The first seal comprises a resilient material and the second seal comprises a compliant material in this example. In a specific example embodiment the second seal has a rectangular cross section. The second seal may be selected from the group consisting of polyester, a silicone adhesive, an acrylic adhesive and an expanding gel seal.

The invention also encompasses, in combination, a pipe element and an adapter. In an example embodiment the adapter comprises a body having an inner surface defining a bore therethrough. An outer surface surrounds the inner surface. A first portion of the outer surface has a plurality of flat surfaces and a plurality of curved surfaces extending around the body. At least a first groove is positioned in the first portion of the outer surface and extends circumferentially about the bore. At least a first seal is positioned within the first groove. Further by way of example the pipe element comprises a sidewall defining a pipe bore. The first portion of the body is received within the pipe bore. A deformation is positioned in the sidewall and extends circumferentially there around. The deformation is aligned with the first groove and engages at least a portion of the outer surface of the body thereby retaining the body within the pipe bore.

Another example embodiment further comprises a second portion of the outer surface having a plurality of flat surfaces extending around the body. By way of example, the deformation comprises a circumferential groove impressed into the sidewall. In a further example, a second seal is positioned within the first groove.

By way of further example, a second groove is positioned in the first portion of the outer surface and extends circumferentially about the bore. A second seal is positioned within the second groove. In this example the second groove is adjacent to the first groove such that the deformation engages both the first and second grooves. An example embodiment further comprises a washer surrounding the outer surface. The washer is positioned between the first and second portions of the outer surface. An outer groove may be positioned in the outer surface to extend circumferentially about the bore. The outer groove is positioned between the first and second portions of the outer surface. The washer is positioned within the outer groove in this example.

In an example embodiment, pipe threads are positioned on the inner surface. Further by way of example, on the first portion of the outer surface, each one of the flat surfaces is contiguous with two of the curved surfaces. In another example, the second portion of the body is larger than a diameter of the pipe bore so as not to interfit within the pipe bore. In an example embodiment, the curved surfaces are convexly curved.

Another example further comprises a second seal surrounding the first sea. The first seal comprises a resilient material and the second seal comprises a compliant material. The second seal engages the sidewall within the pipe bore and conforming thereto. In a specific example embodiment the second seal has a rectangular cross section. By way of example, the second seal may be selected from the group consisting of polyester, a silicone adhesive, an acrylic adhesive and an expanding gel seal.

The invention also encompasses a plug for closing a pipe element. In one example embodiment the plug comprises a body having a cylindrical outer surface. A circumferential groove extends around the outer surface. A shoulder extends outwardly from the outer surface. The shoulder is positioned in spaced relation away from the groove. At least a first seal is positioned within the groove. At least a second seal surrounds the first seal. The first seal comprises a resilient material and the second seal comprises a compliant material in this example embodiment. By way of example, the second seal may be selected from the group consisting of polyester, a silicone adhesive, an acrylic adhesive and an expanding gel seal. In a further example a cavity is positioned within the body. Further by way of example, the shoulder is positioned at an end of the body. The cavity extends into the body from the end.

The invention also encompasses, in combination, a pipe element and a plug. By way of example the plug comprises a body having a cylindrical outer surface. A circumferential groove extends around the outer surface. A shoulder extends outwardly from the outer surface. The shoulder is positioned in spaced relation away from the groove. At least a first seal is positioned within the groove. At least a second seal surrounds the first seal. The first seal comprises a resilient material and the second seal comprises a compliant material in this example. Further by way of example the pipe element comprises a sidewall defining a pipe bore. A portion of the body includes the groove being received within the pipe bore. A deformation is positioned in the sidewall and extends circumferentially there around. The deformation is aligned with the groove and engages the first and second seals and at least a portion of the outer surface of the body thereby sealingly retaining the body within the pipe bore.

By way of example the second seal may be selected from the group consisting of polyester, a silicone adhesive, an acrylic adhesive and an expanding gel seal. In an example embodiment a cavity is positioned within the body. Further by way of example the shoulder is positioned at an end of the body, the cavity extending into the body from the end.

The invention further encompasses a method of effecting a seal between a body and a pipe element. In one example the method comprises:

positioning a seal surrounding the body;
positioning the body and the seal within the pipe element;
forming a circumferential deformation in a sidewall of the pipe element at a position overlying the seal so as to sealingly engage the deformation with the seal.

By way of example the method may further comprise positioning the seal within a circumferential groove in the body. A further example comprises compressing the seal between the deformation and the body. The seal comprises a compliant material and thereby conforms to an inner surface of the pipe element and an outer surface of the body upon the compressing. Another example comprises positioning the body within the pipe element, wherein the body comprises a threaded bore.

DETAILED DESCRIPTION

Figure 1:
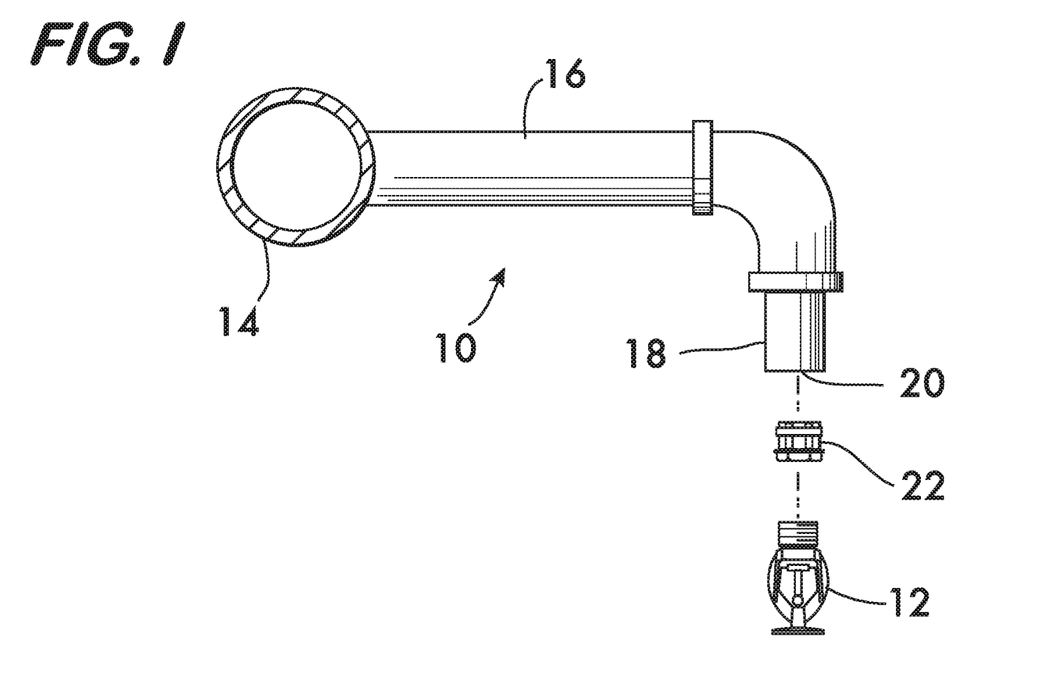
FIG. 1 is an exploded, partial sectional view of an arm over assembly of pipe elements of a sprinkler system.

FIG. 1 illustrates what is commonly called an "arm over" configuration 10 for positioning a sprinkler 12 at a desired location within an area to be protected by a fire suppression system. Arm over configuration 10 includes a header pipe 14, for example, a 2.5 inch pipe that feeds a plurality of branch lines 16. A plurality of sprinklers 12 may be in fluid communication with each branch line 16. In the example shown in FIG. 1 a sprinkler 12 is shown connected to a branch line by a 1 inch schedule 40 size pipe element 18. Pipe element 18 has a bore 20.

Connection of the sprinkler 12 to the pipe element 18 according to the invention is effected by an adapter 22. Adapter 22 is shown in detail in FIGS. 2 and 3 and comprises a body 24. Body 24 may be formed of carbon steel, stainless steel, brass as well as other materials and has an inner surface 26 that defines a bore 28 which extends through the body. An outer surface 30 of body 24 surrounds the inner surface 26. At least a portion, 30a, of body 24 is sized to interfit within the bore 20 of pipe element 18 (see FIG. 1). In the example shown in FIGS. 2 and 3, portion 30a of the outer surface 30 has a plurality of flat surfaces 32 on it. Curved surfaces 33 are positioned between flat surfaces 32 on portion 30a, each flat surface thus being contiguous with two curved surfaces. In the example the curved surfaces are convex, but other embodiments may have concave surfaces for example.

Figure 2:
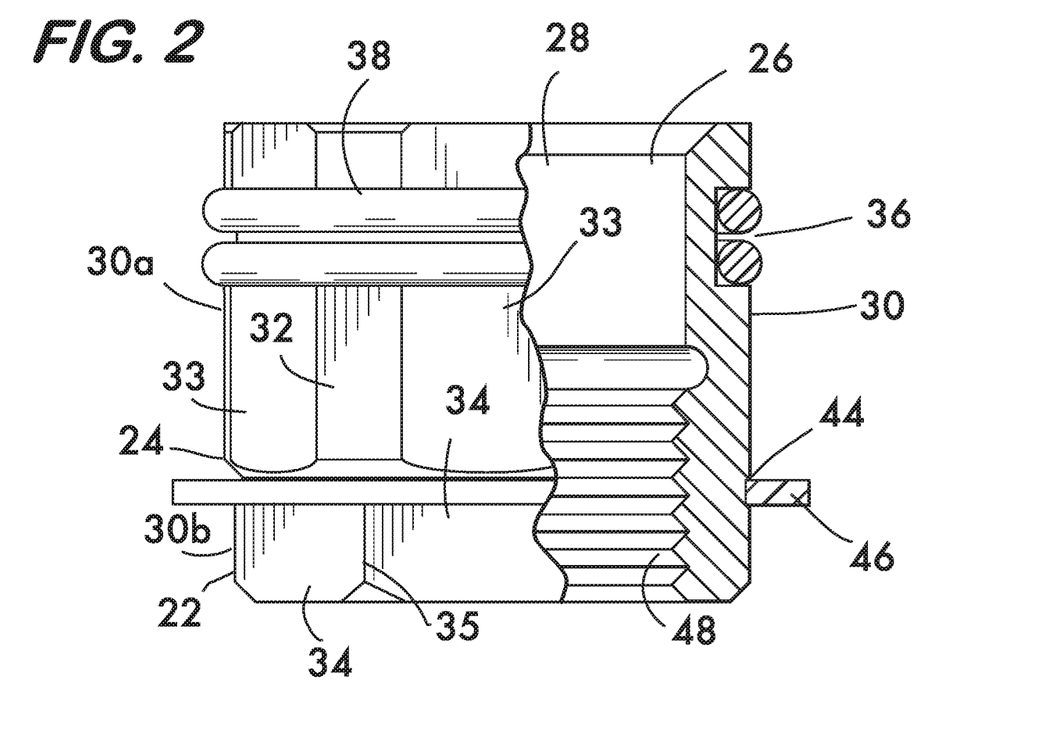
FIG. 2 is a partial sectional view of an example embodiment of an adapter according to the invention.
Figure 3:
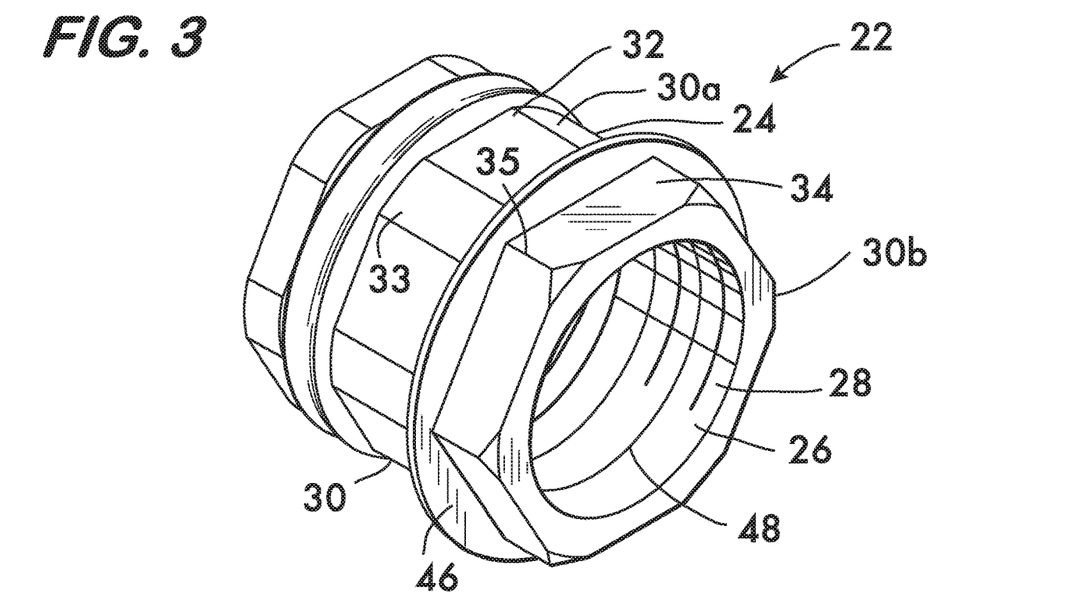
FIG. 3 is an isometric view of the adapter shown in FIG. 2.

A second portion 30b of the outer surface 30 also has a plurality of flat surfaces 34 on it. On second portion 30b there are no intervening curved surfaces between the flat surfaces 34. Flat surfaces 34 are contiguous with one another at projecting corners 35 on portion 30b. Having convexly curved surfaces 33 between flat surfaces 32 on portion 30a of outer surface 30 reduces the size of a portion of body 24 and permits it to be received within bore 20 of pipe element 18. Outer surface portion 30b, with no convexly curved surfaces, is larger in size, and the corners 35 where the surfaces 34 meet engage the pipe element and act as a stop, limiting the depth to which the body 24 may be inserted into the pipe bore 20.

Figure 4:
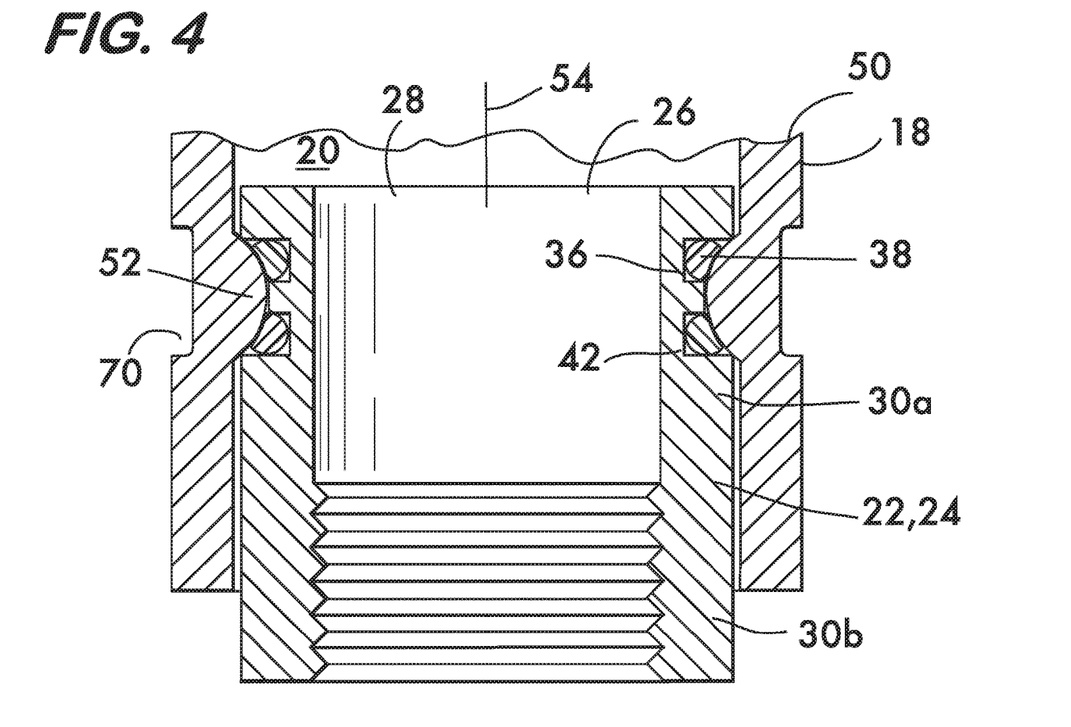
FIG. 4 is a longitudinal sectional view of an example embodiment of a combination pipe element and adapter according to the invention.

Outer surface 30 of body 24 has additional features, including grooves that extend circumferentially around the bore 28. As shown in FIG. 2, a groove 36 is positioned in portion 30a of outer surface 30 and receives one or more seals 38 which seal the space between the body 24 and the pipe element 18 when the adapter is received within the pipe bore 20 as described below. In this example, seals 38 comprise O-rings made of an elastomer such as EPDM. Other types of seals and other materials are also feasible. As shown in FIG. 4, a second seal receiving groove 42 may also be positioned in portion 30a of outer surface 30. In the example embodiment illustrated the grooves are adjacent to one another.

Figure 5:
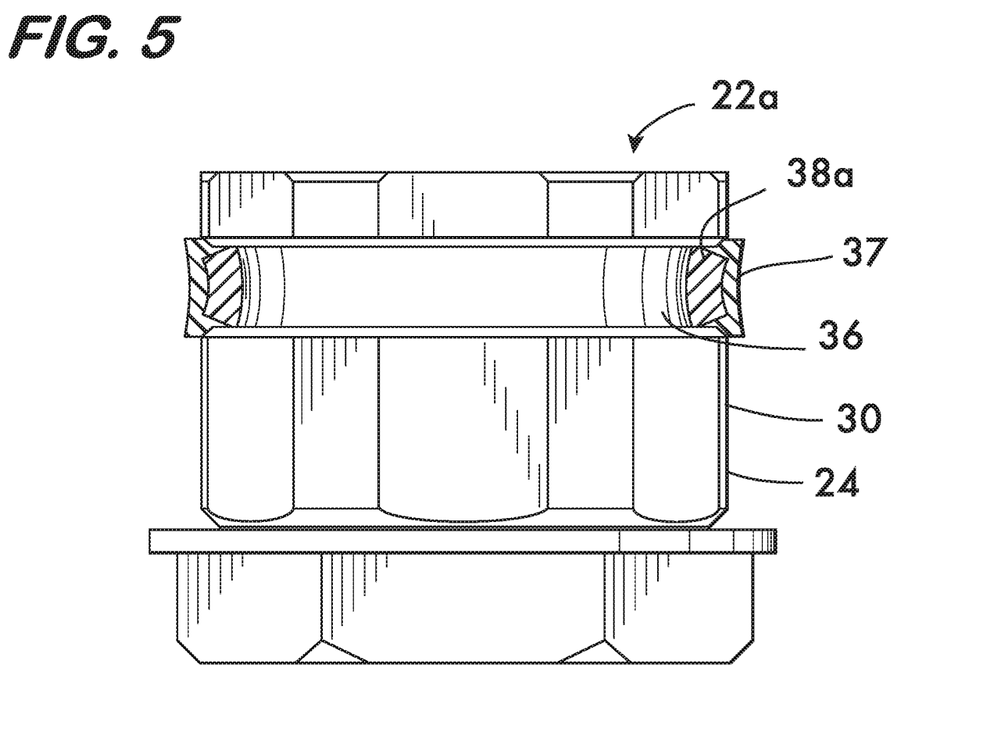
FIG. 5 is a partial sectional view of an example adapter having a compliant seal.
Figure 6:
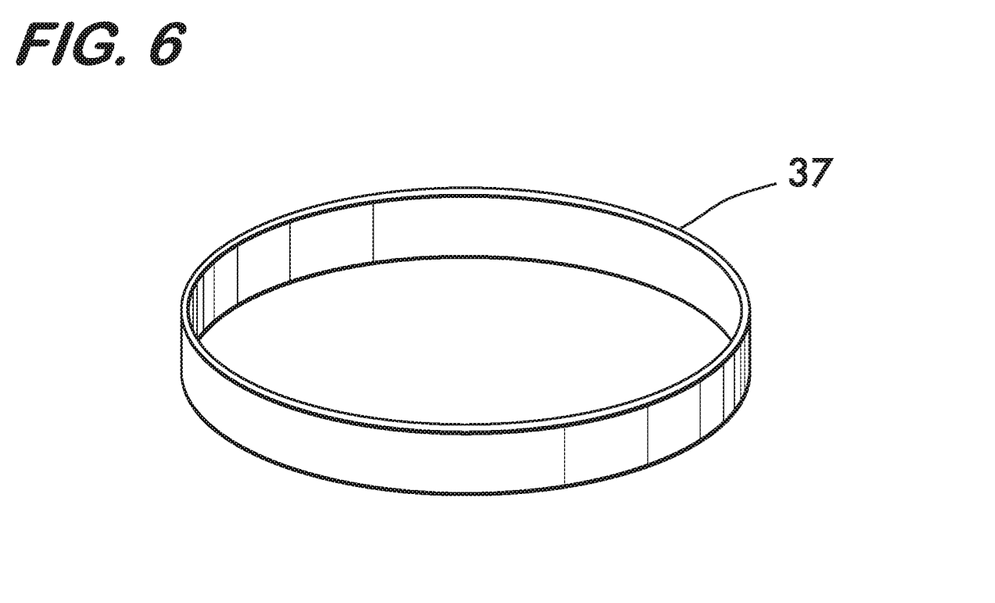
FIG. 6 is an isometric view of a compliant seal used in an example embodiment of the invention.
Figure 7:
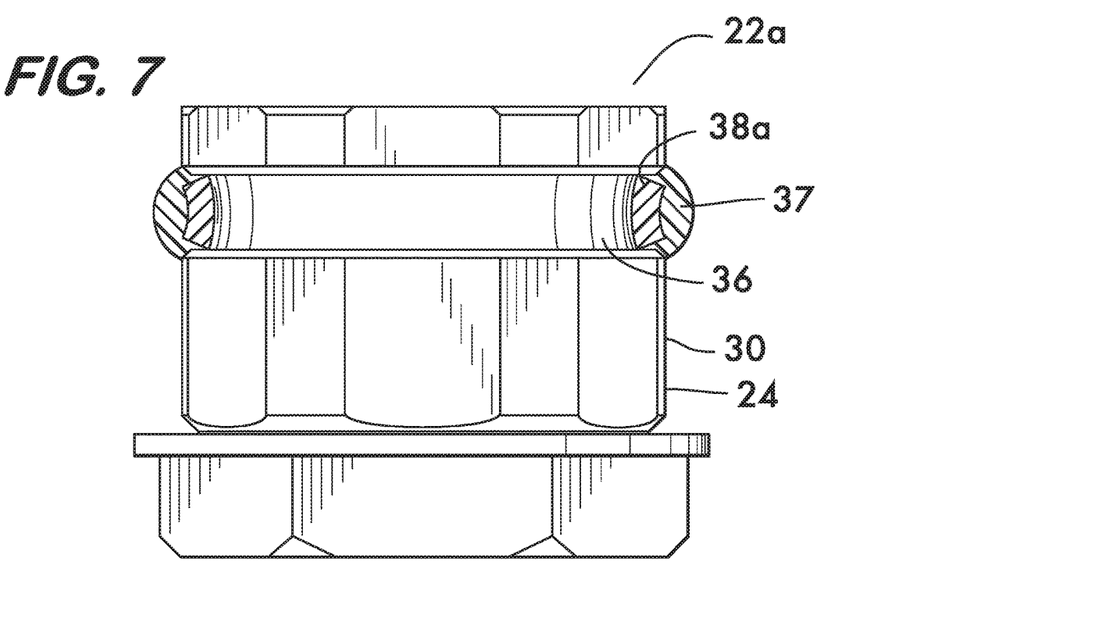
FIG. 7 is a partial sectional view of an example embodiment of an adapter according to the invention having a compliant gel seal.

In another example adapter embodiment 22a, shown in FIG. 5, a first seal 38a is positioned within a groove 36 in the outer surface 30 of body 24. A second seal 37 surrounds the first seal 38a. In this example embodiment the first seal 38a has a rectangular cross section when unstretched. The second seal 37 may also have a rectangular cross section when undeformed and could comprise a closed loop or a strip of material as shown in FIG. 6. It is advantageous to form the first seal 38a from a resilient material, for example elastomers such as EPDM or other rubber compounds. It is further advantageous to form the second seal 37 from a compliant material such as polyester, a silicone based adhesive, or an expanding locking gel such as ES0105 Expand-A-Seal, supplied by ND Industries of Clawson, Mich. The gel contains separate microencapsulated beads of epoxy resin and hardener which are activated when the gel is compressed. As shown in FIG. 7, the gel seal 37 is applied over the first seal 38a within the groove 36. The gel hardens and adheres to the first seal 38a. Upon compression of the seal 37 the beads are crushed, releasing the resin and hardener, which combine to expand and harden into an effective seal that conforms to the space into which it expands, as described below.

With reference again to FIG. 2, another groove 44 may be positioned in outer surface 30. Groove 44 demarcates the border between portion 30a and 30b of outer surface 30. Groove 44 receives a washer 46 which projects radially from body 24 and covers gaps between pipe bore 20 and body 24 when the body is received therewithin. The gaps result from a round bore 20 receiving a non-round adapter body 24. Washer 46 may be made of plastic, for example, polyethylene.

As shown in FIGS. 2 and 3, the inner surface 26 of body 24 in this example has tapered internal pipe threads 48. The tapered pipe threads permit the adapter 22 to receive the matching tapered threaded end of sprinkler 12 and form a fluid tight seal using traditional pipe dope and/or Teflon tape.

In a practical design of adapter 22, hexagonal bar stock is turned on a screw cutting lathe to form the bore 28 and cut the pipe threads 48. The lathe is also used to remove the corners from a portion of the hexagonal bar stock to form the convexly curved surfaces 33 between the flat surfaces 32 on portion 30a of outer surface 30. The grooves 36, (42 when present) and 44 are then cut in outer surface 30, and the washer 46 and seals 38 are positioned in their respective grooves.

Removing the corners of the hexagonal bar stock to form portion 30a of outer surface 30 reduces the size of body 24 so that it fits within the pipe bore 20. Corners 35 remain however, on portion 30b of outer surface 30 and, because they extend outwardly from body 24 and are larger than the diameter of the pipe bore 20, will engage the end of the pipe element 18 and limit the depth of engagement between the body and the pipe. Limiting this engagement also serves to position the grooves 36 and 42 and their seals 38 in a precise known location to permit installation of the body 24 within the pipe bore as shown in FIG. 4. The effect is similar for adapter embodiment 22a with respect to groove 36 and seals 37 and 38a (see FIG. 5).

FIG. 4 illustrates an example embodiment of a combination pipe element 18 and adapter 22 according to the invention. Adapter 22 is received within bore 20 of the pipe element 18. In one example embodiment this means that portion 30a of the outer surface 30 is within the bore 20, while portion 30b remains outside of the bore. Grooves 36 and 42 and their seals 38 are thus positioned at a known distance from the end of the pipe element 18. Bore 20 of the pipe element 18 is defined by a sidewall 50. A deformation 52 is positioned in the sidewall 50 and extends circumferentially around it. Deformation 52 is formed in a position which places it in alignment with grooves 36 and 42 and seals 38. The deformation 52 mechanically engages the grooves 36 and 42, seals 38 and the flat surfaces 32 (see FIG. 2). Mechanical engagement between the deformation 52 and the seals 38 effects a fluid tight joint between the adapter 22 and the pipe element 18. Mechanical engagement between the deformation 52 and the grooves 36 and 42 retains the adapter 22 against axial pressure within the pipe element 18. The retention force achieved is well in excess of the force caused by the maximum expected pressure in a fire suppression system. Furthermore, mechanical engagement between the deformation 52 and the flat surfaces 32 prevents relative rotation between the adapter 22 and the pipe element 18 about the pipe element longitudinal axis 54 and allows in excess of 3 times the torque to be applied to the adapter 22 than if friction were the only force preventing relative rotation.

Figure 8:
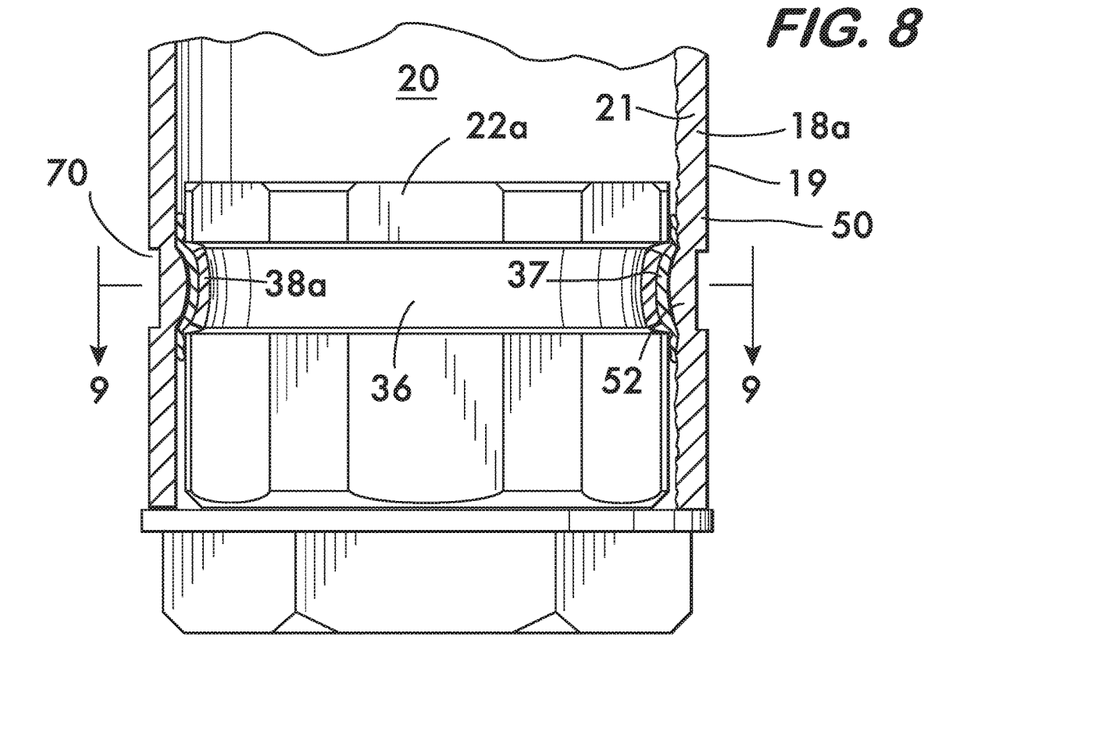
FIG. 8 is a longitudinal sectional view of the example combination pipe element and adapter.
Figure 9:
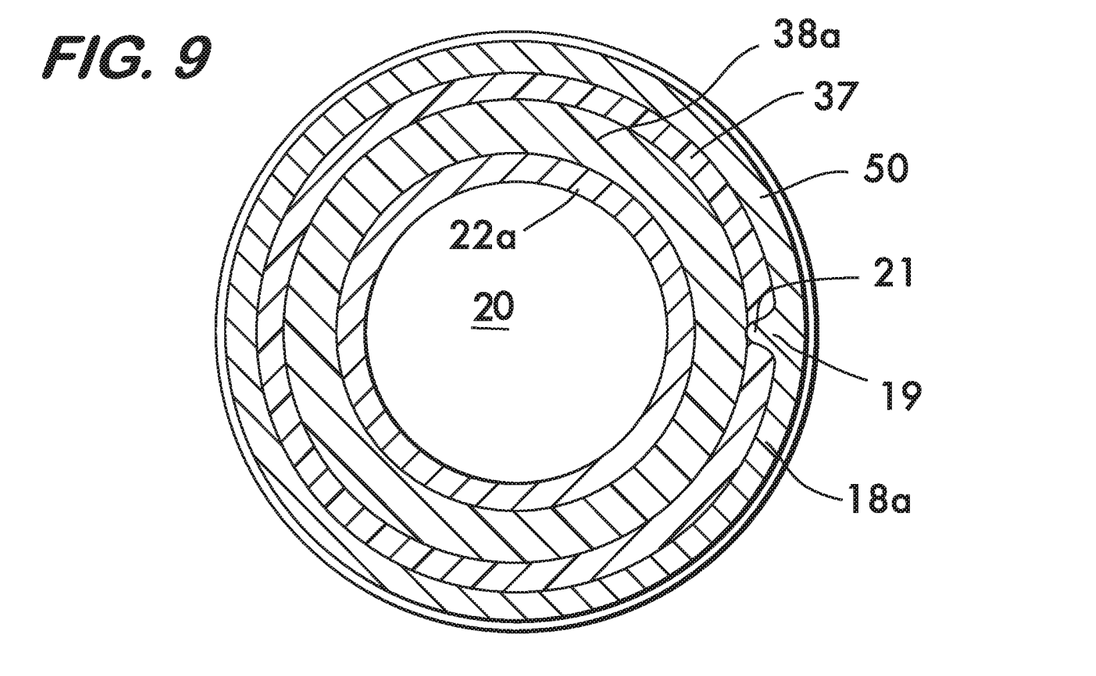
FIG. 9 is a cross sectional view of an example embodiment of a combination pipe element and adapter taken at line 9-9 of FIG. 8.

The example combination shown in FIG. 4 is expected to be effective for seamless pipe elements 18. For pipes 18a having a welded longitudinal seam 19 as shown in FIGS. 8 and 9 it is expected that the adapter 22a having the first and second seals 37 and 38a shown in FIGS. 5 and 7 will be effective. As shown in cross section in FIG. 9 the weld seam 19 forms an irregular projection 21 on the sidewall 50 within the pipe bore 20. As shown in FIG. 8, to ensure a fluid tight seal in the area of seam 19 it is advantageous to use the first, resilient seal 38a to act as a biasing element and bias the second, compliant seal 37 against the deformation 52. When the deformation 52 is formed the compliant seal 37 will be compressed between the deformation and the resilient seal 38a. Due to its compliant nature, the compliant seal 37 conforms to the shape of the space between the resilient seal 38a and the deformation 52 of sidewall 50 to form a fluid tight seal, accommodating any irregularities of the sidewall surface, such as the projection 21 of the weld seam 19. Additional advantage may be realized when using an expanding gel seal 37 as described above.

Figure 10:
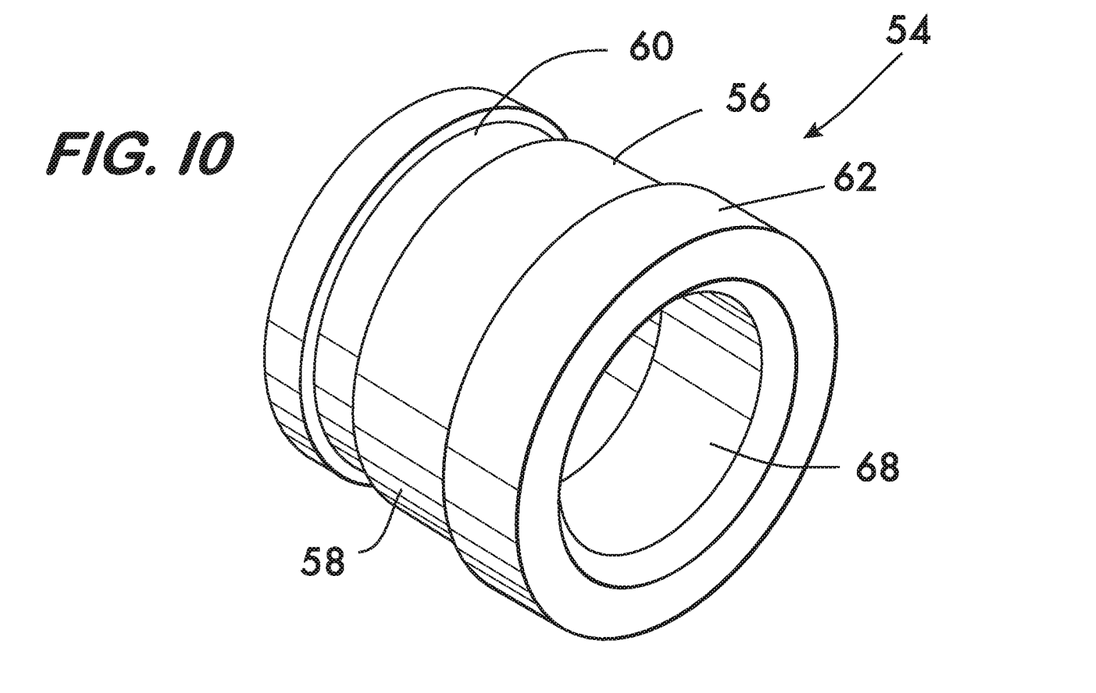
FIG. 10 is an isometric view of an example plug according to the invention.
Figure 11:
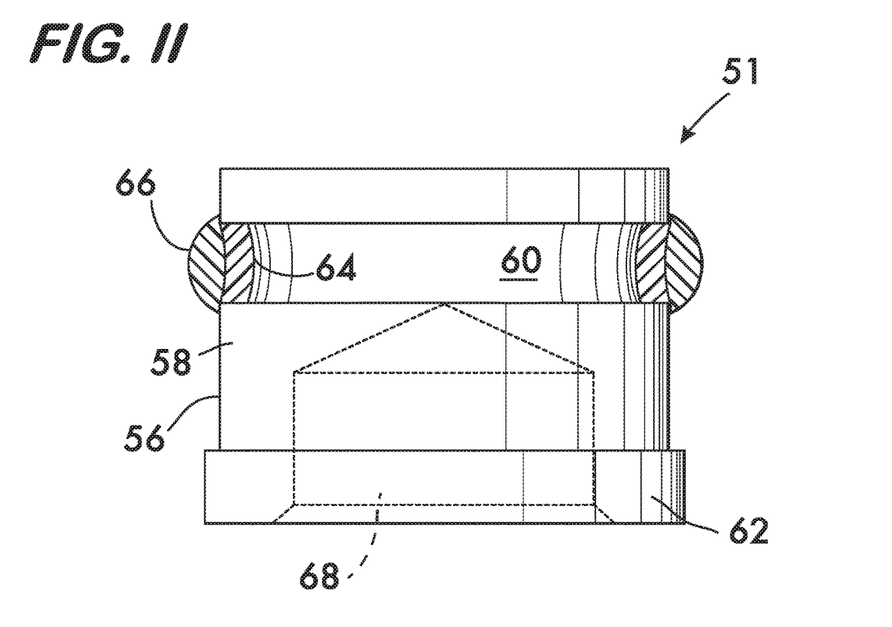
FIG. 11 is a partial sectional side view of the plug shown in FIG. 10.

In addition to attaching a sprinkler to a pipe element it is also desirable to be able to conveniently seal off a pipe element, for example, at the end of a pipe run. This is readily accomplished using a plug 54, an example of which is shown in FIG. 10. Example plug 54 comprises a body 56 sized to fit within the pipe element. Body 56 has a cylindrical outer surface 58 and may be formed from round stock turned on a lathe from materials such as steel, stainless steel or other metals. A circumferential groove 60 is positioned in outer surface 58 of body 56 proximate one end. A shoulder 62 is positioned in spaced relation away from the groove 60, in this example, positioned proximate an opposite end of body 56. Shoulder 62 has a larger diameter than body 56 and is sized to engage the end of the pipe element into which plug 54 is inserted and limit the extent of engagement between the plug and the pipe element (see FIG. 12). As shown in FIG. 11, groove 60 receives one or more seals for effecting a fluid tight seal between the plug 54 and the pipe element 18. In the example shown, a first seal 64 is positioned within groove 60 and is formed of a flexible, resilient material, for example an elastomer such as EPDM or other rubber compound. Such a single seal (for example, an O-ring) may be adequate for sealing a smooth inner surface of a pipe element; however, for pipe elements having a rough or irregular inner surface (such as welded seam pipe) it is advantageous to position a second seal 66 around the first seal 64. As described above, the second seal is formed of a compliant material, for example, polyester, a silicone based adhesive, an acrylic adhesive or an expanding gel seal which conform to the irregular surface within the pipe element to effect a seal.

Figure 12:
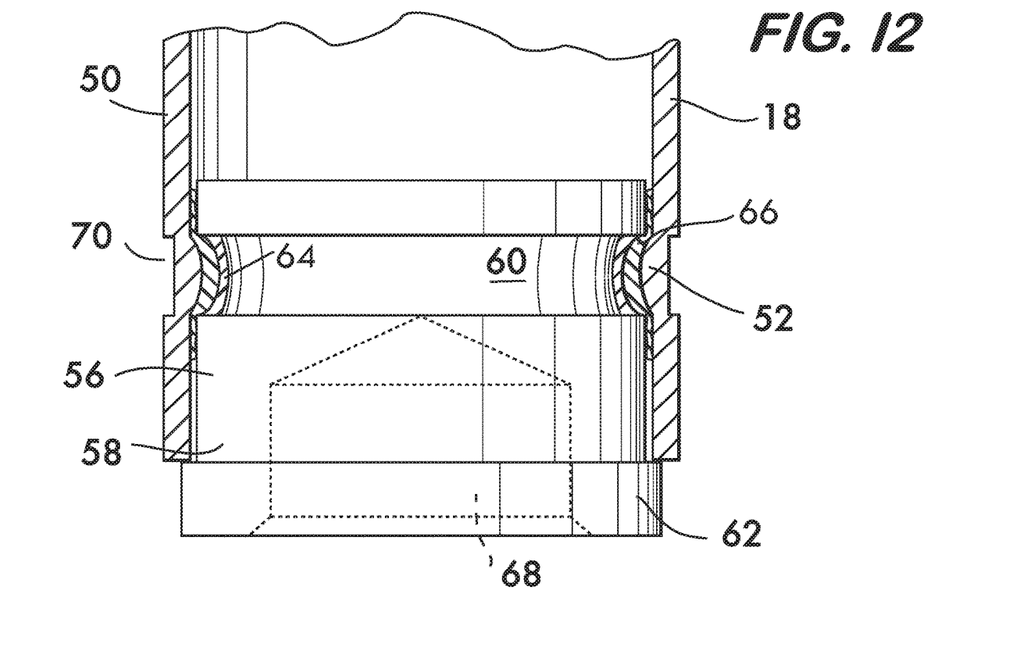
FIG. 12 is a sectional view of an example combination pipe element and plug according to the invention.

FIGS. 10 and 11 also illustrate a cavity 68 formed within the body 56. Cavity 68 may receive a tool for handling and positioning the plug 54 within the pipe element when forming a deformation in the pipe element which cooperates with the seals 64 and 66 to effect a fluid tight seal between the plug and the pipe element. An example combination pipe element 18 and plug 54, the pipe element having a deformation 52 engaging the seals 64 and 66, is shown in FIG. 12. Deformation 52 also mechanically engages the body 56 of plug 54 within groove 60 to retain the plug within the pipe element against internal pressure.

By way of example, for both the adapter 22 (and 22a) and the plug 54, deformation 52 of pipe element 18 is formed by a circumferential groove 70 impressed into sidewall 50. Formation of circumferential groove 70 is conveniently accomplished by cold working the pipe element 18 once the adapter or plug is in place within the pipe element. Groove 70 is formed at a position such that the deformation 52 engages the groove 36 in the adapter or groove 60 in the plug, along with their associated seals. Cold working of the pipe element may be via roll grooving methods and devices as well as devices employing rotating cams.

Use of the adapter according to the invention totally eliminates thread cutting during the installation of piping networks. There is thus no need for a thread cutting machine and its concomitant oil mess and waste metal chips. The same groove forming device (roll groover, cam groover) that deforms the pipe element to secure and seal the adapter according to the invention within the pipe element is also used to cold form circumferential grooves in pipe elements so they can be joined by groove engaging mechanical couplings, lending significant improvement to efficiency and convenience of the process.

What is claimed is:
1. In combination, a pipe element and a plug, said plug comprising:
   a body having a cylindrical outer surface;
   a circumferential groove extending around said outer surface;
   a shoulder extending outwardly from said outer surface, said shoulder being positioned in spaced relation away from said groove;
   at least a first seal positioned within said groove and contacting said body;
   at least a second seal overlying said first seal; wherein
   said first seal comprises a resilient material and said second seal comprises a compliant material; and
   said pipe element comprises:
      a sidewall defining a pipe bore, a portion of said body including said groove being received within said pipe bore;
      a deformation positioned in said sidewall and extending circumferentially there around, said deformation being aligned with and extending into said groove and contacting said second seal and thereby sealingly retaining said body within said pipe bore, and plugging said pipe element.

2. The plug according to claim 1, wherein said second seal is selected from the group consisting of polyester, a silicone adhesive, an acrylic adhesive and an expanding gel seal.

3. The plug according to claim 1, further comprising a cavity positioned within said body.

4. The plug according to claim 3, wherein said shoulder is positioned at an end of said body, said cavity extending into said body from said end.

\* \* \* \* \*